(12) United States Patent
Sung et al.

(10) Patent No.: US 7,250,990 B2
(45) Date of Patent: Jul. 31, 2007

(54) 2D AND 3D DISPLAY DEVICE HAVING A PARTICULAR LIGHT CONTROL DEVICE

(75) Inventors: Gee-young Sung, Daegu-si (KR); Byoung-so Choi, Seoul (KR); Seung-ho Nam, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 357 days.

(21) Appl. No.: 11/008,128

(22) Filed: Dec. 10, 2004

(65) Prior Publication Data
US 2005/0134762 A1  Jun. 23, 2005

(30) Foreign Application Priority Data
Dec. 10, 2003  (KR) .................. 10-2003-0089356

(51) Int. Cl.
*G02F 1/1335* (2006.01)
(52) U.S. Cl. .......................... 349/15; 349/96
(58) Field of Classification Search ............... 349/15, 349/96
See application file for complete search history.

(56) References Cited

U.S. PATENT DOCUMENTS 6,157,424 A * 12/2000 Eichenlaub ................. 349/74
6,377,295 B1 * 4/2002 Woodgate et al. ........... 348/59
6,929,369 B2 * 8/2005 Jones ........................ 353/10
7,058,252 B2 * 6/2006 Woodgate et al. ........... 385/16

FOREIGN PATENT DOCUMENTS

| JP | 49-31330 | 3/1974 |
|---|---|---|
| JP | 53-27661 | 3/1978 |
| JP | 2-181138 A | 7/1990 |
| JP | 10-115800 A | 5/1998 |
| JP | 10/123461 A | 5/1998 |
| JP | 10-206794 A | 8/1998 |
| JP | 2001-45521 A | 2/2001 |

* cited by examiner

*Primary Examiner*—Mike Qi
(74) *Attorney, Agent, or Firm*—Sughrue Mion, PLLC (57) ABSTRACT

A display device that can selectively display 2D and 3D images is provided. The display device includes a backlight unit, a liquid crystal device, and a light control device including two polarizing plates interposed between the backlight and the liquid crystal device each of the polarizing plates having a polarized pattern, and one of the polarizing plates being moveable. Therefore, the display device can selectively display 2D and 3D images by moving one of the polarizing plates parallel to the other polarizing plate, and a width of a light valve can be controlled by the degree of non-alignment of the polarizing plates.

15 Claims, 7 Drawing Sheets

2D AND 3D DISPLAY DEVICE HAVING A PARTICULAR LIGHT CONTROL DEVICE

BACKGROUND OF THE INVENTION

This application claims the priority of Korean Patent Application No. 2003-89356 filed on Dec. 10, 2003, in the Korean Intellectual Property Office, the disclosure of which is incorporated herein in its entirety by reference.

1. Field of the Invention

The present invention relates to an electronic display device, and more particularly, to a display device that can selectively display two-dimensional (2D) and three-dimensional (3D) images.

2. Description of the Related Art

Generally, to display a 3D image, binocular parallax is used. To display a 3D image using binocular parallax, either a stereoscopy method, wherein glasses are required, or an autostereoscopy method, wherein no glasses are required, have conventionally been used. Stereoscopy can require the use of polarized glasses or liquid crystal shutter glasses. Autostereoscopy uses a lenticular display, a parallax barrier screen, or a parallax illumination.

Stereoscopy is mainly used when many people are viewing a 3D image, such as in a theater using a polarized projector. Autostereoscopy, on the other hand, is mainly used when a small group of people are viewing an image, such as for personal use, display for a game, in a home TV set, in an exhibition display, etc.

The principle of 3D display using the parallax illumination which is an autostereoscopy method, is disclosed in U.S. Pat. No. 4,717,949, entitled "Autostereoscopy Display with Illuminating Lines and Light Valve."

Figure 1:
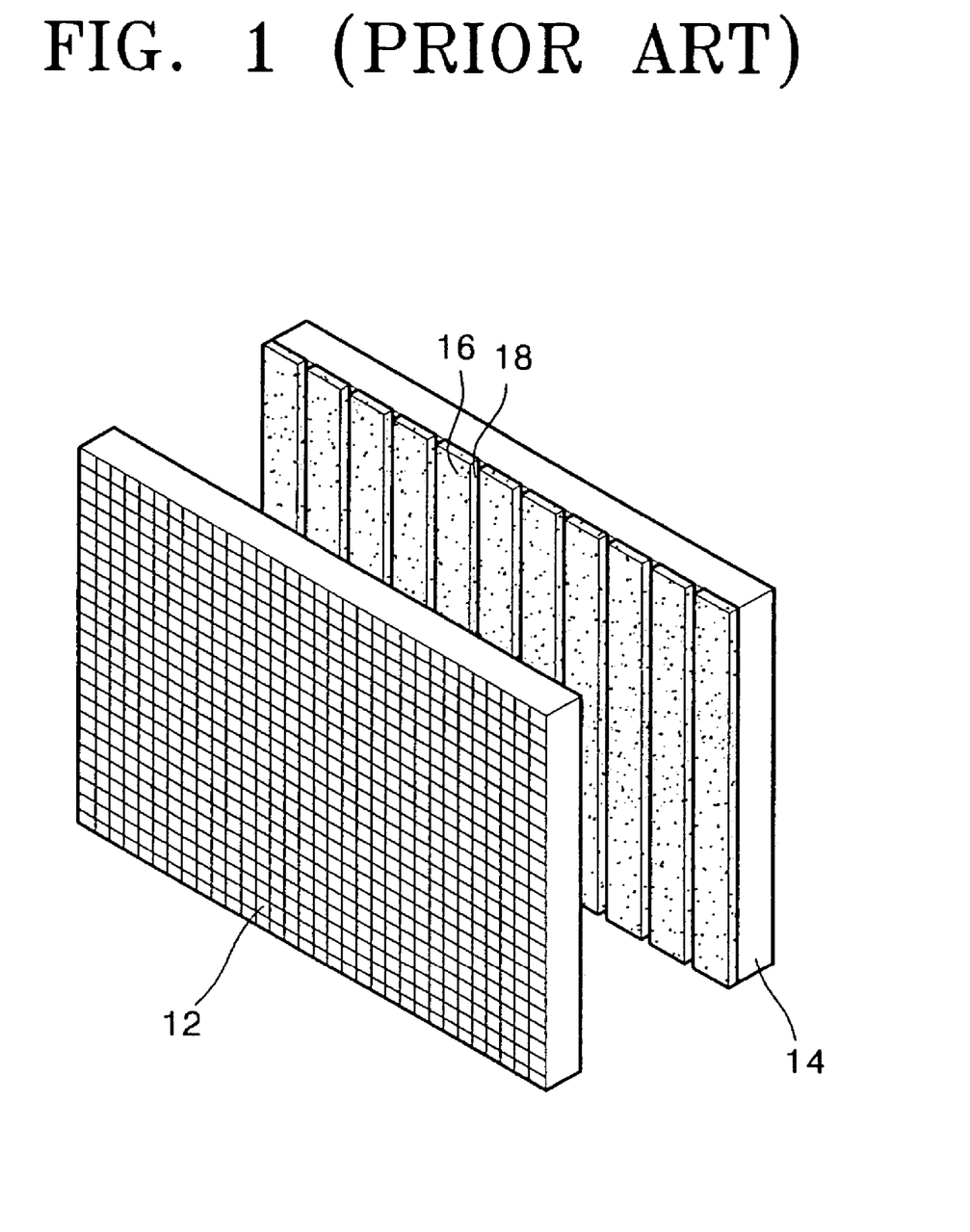
FIG. 1 is a perspective view of a conventional autostereoscopic display.

FIG. 1 is a perspective view of a display device according to the parallax illumination method disclosed in U.S. Pat. No. 4,717,949.

As depicted in FIG. 1, a display device implementing the parallax illumination method comprises a liquid crystal display 12 on which an image is displayed and an illumination plate 14, a front surface of which has a stationary barrier 16 having a plurality of slits 18 formed at a periodic interval on the back of the stationary barriers 16.

When light is emitted from a backlight mounted in the illumination plate 14, the illumination plate 14 becomes a backlight for the 3D image that irradiates light having stripe forms by passing through the plurality of slits 18 between the barriers 16. Pixels of odd-numbered columns of the LCD 12 display a left eye image observed by the left eye and the pixels of even-numbered columns display right eye image observed by right eye, thus obtaining a three dimensional image.

This method can only display three dimensional images. Therefore, since movies with 3D contents are relatively rare, consumers do get much use out of this device. Accordingly, there is a need to develop a display device capable of switching back and forth from 2D to 3D images as required.

Figure 2:
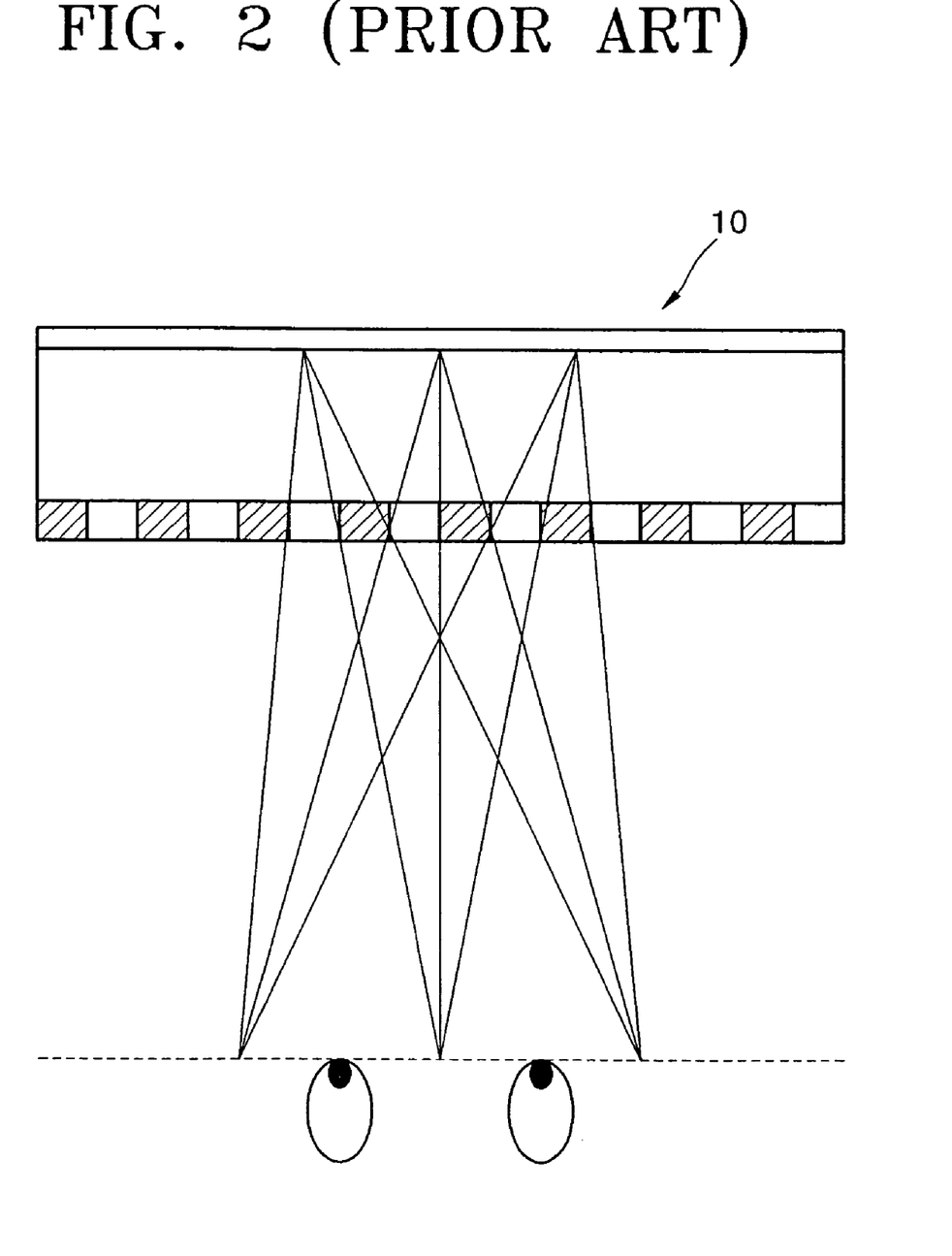
FIG. 2 is a cross-sectional view of a conventional autostereoscopic display that can display both 2D and 3D images.

FIG. 2 is a cross-sectional view of an autostereoscopic display disclosed in U.S. Pat. No. 6,157,424, which is a typical display unit that can display both 2D and 3D images.

The autostereoscopic display depicted in FIG. 2 has a structure that employs a liquid crystal shutter 10 which mounted behind a LCD 62, instead of stationary barriers 16. In this structure, the backlight can be used selectively as a 2D backlight that generally uniformly irradiates light and a 3D backlight that irradiates light of stripe form spaced apart with a predetermined distance by regionally controlling the permeability distribution of light generated from a backlight by a liquid crystal shutter 10 using an electrical signal.

The autostereoscopic display can easily alternate between 2D and 3D mode, however, a liquid crystal shutter 10 must be disposed behind the LCD 62. That is, two glass panels have to be used, thereby increasing the overall thickness of the LCD. Also, high power consumption is required to produce both 2D and 3D images.

SUMMARY OF THE INVENTION

The present invention provides a display device that employs a pair of patterned polarizers in a stationary parallax illumination device combined with a 2D display and can switch between displaying 2D and 3D images by slightly moving the polarizers parallel to each other.

According to an aspect of the present invention, there is provided a display device that can switch between displaying 2D and 3D images, comprising: a backlight unit; a liquid crystal device; and a light control device that includes a pair of polarizing plates, disposed between the backlight and the liquid crystal device, wherein each polarizing plate of the pair of the polarizing plates have polarizing patterns, and at least one of the pair of the polarizing plates is moveable.

According to another embodiment of the present invention, there is provided a display device for displaying 2D images including a backlight unit and a liquid crystal device, in which a light control device that includes a pair of polarizing plates each having a polarizing pattern are disposed in front of the liquid crystal device, and a parallax illumination occurs by moving one of the pair of polarizing plates.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY NON-LIMITING EMBODIMENTS OF THE INVENTION

Exemplary embodiments of the present invention will now be described more fully with reference to the accompanying drawings. Like reference numerals refer to like elements throughout the drawings.

Figure 3:
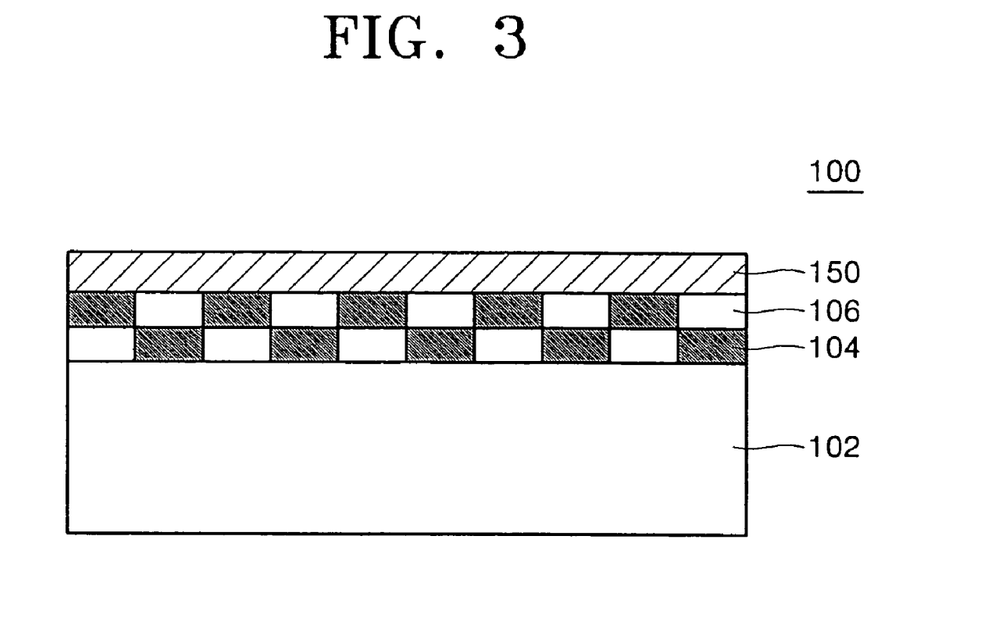
FIG. 3 is a cross-sectional view of a display device consistent with a second exemplary embodiment of the present invention.

FIG. 3 is a cross-sectional view of a display device according to a first embodiment of the present invention.

Referring to FIG. 3, a LCD display device 100 comprises a backlight unit 102, a first polarizing plate 104, a second polarizing plate 106, and a thin film transistor liquid crystal device (TFT-LCD) 150. The LCD display device is not limited to using the TFT-LCD 150, but can include any transmissive display.

Figure 4:
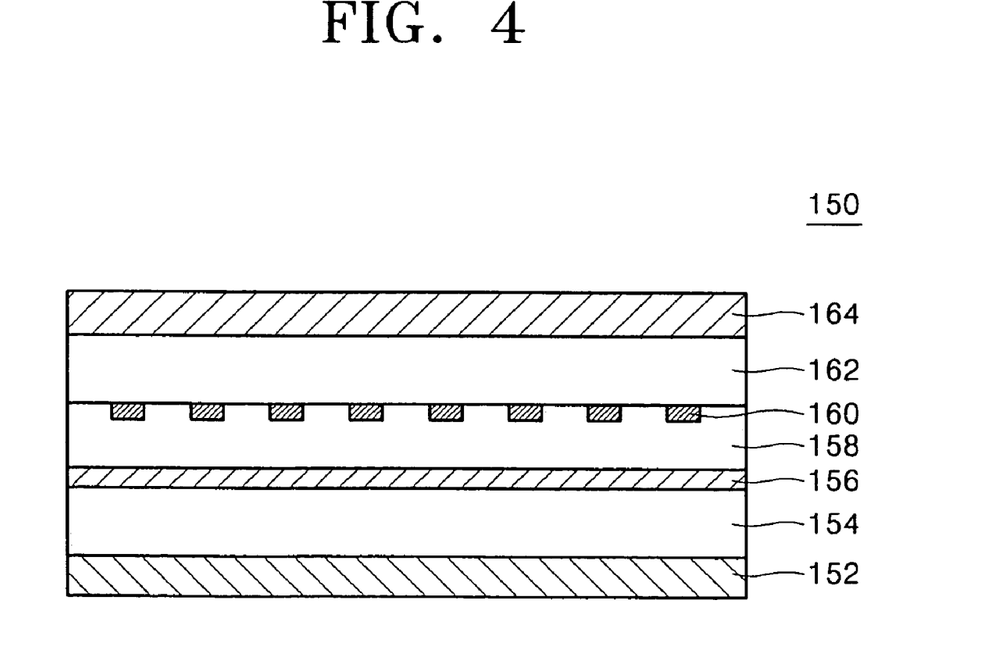
FIG. 4 is a cross-sectional view of one exemplary embodiment of a the thin film transistor-liquid crystal device (TFT-LCD)

FIG. 4 is a cross-sectional view of the TFT-LCD 150 of FIG. 3.

Referring to FIG. 4, the TFT-LCD 150 comprises a first transparent substrate 154 having a third polarizing plate 152 disposed on a surface of the first transparent substrate 154, a transparent electrode 156 disposed on the other surface of the first transparent substrate 154, a liquid crystal unit 158 formed on the transparent electrode 156, a patterned transparent electrode 160 facing the transparent electrode 156 in the liquid crystal unit 158, a second transparent substrate 162 formed on the patterned transparent electrode 160, and a frontal polarizing plate 164 formed on the second transparent substrate 162.

The first and the second transparent substrate 154 and 162 may be formed of glass or polymer, and the transparent electrode 156 and the patterned transparent electrode 160 may both be formed of Indium-Tin-Oxide (ITO). However, those of skill in the art would recognize that other materials may be used.

A maximum amount of light is transmitted through the two polarizing plates 104 and 106 when the two polarizing plates 104 and 106 are placed parallel to each other, and no light is transmitted when the plates are placed perpendicular each other. The polarizing plates 104 and 106 can be formed by absorbing iodine or a bicolor dye on a patterned vertical alignment (PVA) film which is a polymer elongated to one direction. However, those of skill in the art would recognize that other materials may be used.

Figure 5A:
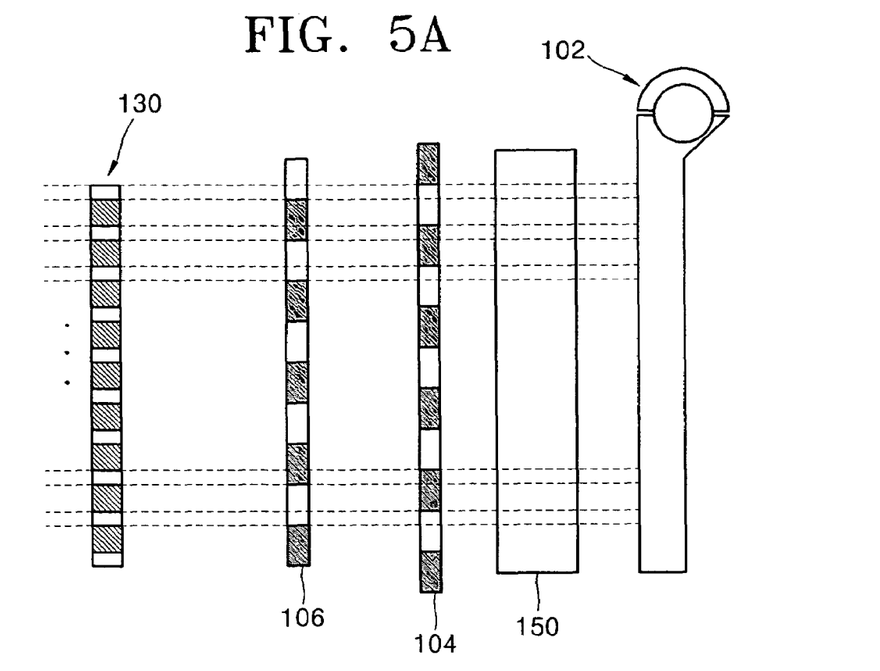
FIGS. 5A and 5B are cross-sectional views illustrating the operation of the display device consistent with a first exemplary embodiment of the present invention wherein a pair of linear polarizing plates are disposed in front of the TFT-LCD.
Figure 5B:
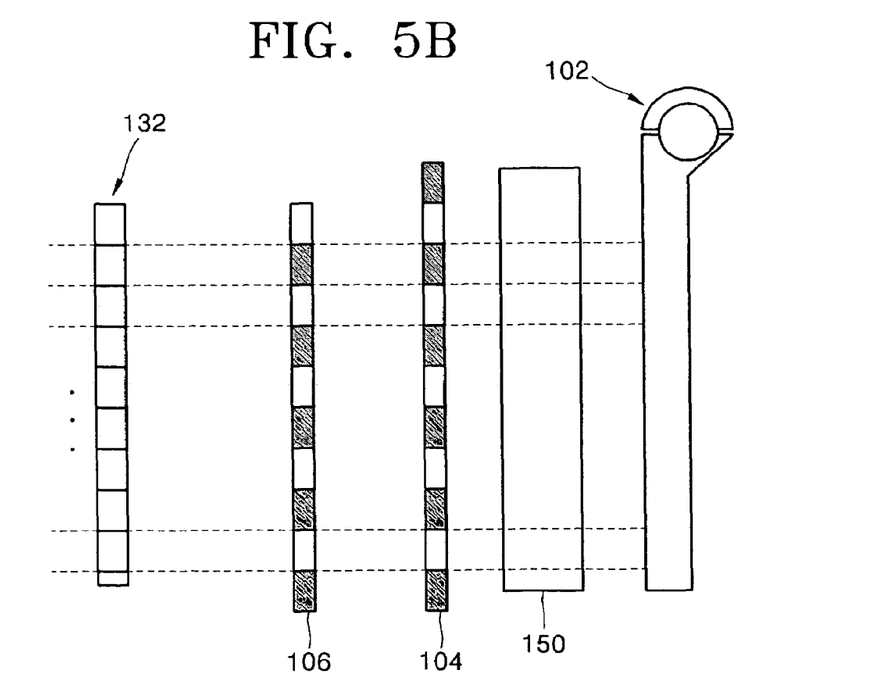

FIGS. 5A and 5B are cross-sectional views illustrating the operation of the display when a pair of linear polarizing plates 104 and 106 are disposed in front of the TFT-LCD 150. In the drawings, the black colored regions of the pair of linear polarizing plates 104 and 106 represents 90° polarizing patterns, and the white region represents 0° polarizing patterns.

According to a first exemplary embodiment of the present invention, the frontal polarizing plate 164 of TFT-LCD 150 (see FIG. 4) is a 45° polarizing plate and the third polarizing plate 152 of TFT-LCD 150 is a 135° polarizing plate, and each of the first and the second polarizing plates 104 and 106 have an alternating 0° and 90° polarizing patterns.

Referring to FIG. 5A, light emitted from the backlight unit 102 reaches the first polarizing plate 104 after passing through the TFT-LCD 150. At this time, 45° polarized light exits from the TFT-LCD 150 since the light has to pass the front polarizing plate 164 having 45° polarization.

Then, the 45° polarized light passes through the 0° polarizing patterns and the 90° polarizing patterns of the first polarizing plate 104. Accordingly, the light passed through the first polarizing plate 104 has stripe form portions of 0° polarized light and stripe form portions of 90° polarized light, alternately disposed. Intensities of the 0° polarized light and the 90° polarized light are equal.

Next, the light having portions of the 0° polarized stripe form and the 90° polarized stripe form enters to the second polarizing plate 106. According to the present embodiment, it is preferred, but not necessary, that the second polarizing plate 106 has the same polarizing pattern as the first polarizing pattern 104. However, the size of the 0° and 90° polarizing patterns of the second polarizing plate 106 may be different from each other.

Phases of the polarizing patterns of the first polarizing plate 104 and those of the second polarizing plate 106 can be placed in a non-aligned manner by slightly moving one of the first polarizing plate 104 or the second polarizing plate 106 parallel to each other. This non-aligned state is shown in FIG. 5A.

In this case, the 0° polarized light exiting from the first polarizing plate 104 cannot pass through the 90° polarizing patterns but can pass through the 0° polarizing patterns of the second polarizing plate 106, and the 90° polarized light exiting from the first polarizing plate 104 cannot pass through the 0° polarizing patterns but can pass through the 90° polarizing patterns of the second polarizing plate 106. Thus, a light pattern 130 exits second polarizing plate 106.

From this effect, the pair of polarizing plates 104 and 106 act as a 3D barrier through which light having a line-shaped pattern passes so that a left eye and a right eye observe separate images. Thus, a 3D effect can be obtained by generating a left image for observation by a viewer's left eye in odd-numbered columns of the TFT-LCD 150 and generating a right image for observation by the viewer's right eye in even-numbered columns of the TFT-LCD 150.

Referring to FIG. 5B, the patterns of the first and the second polarizing plates 104 and 106 are aligned by slightly moving one of the first polarizing plate 104 and the second polarizing plate 106 parallel to the other such that the light passing through the of 0° polarizing patterns of the first polarizing plate 104 can pass through the 0° polarizing patterns of the second polarizing plate 106, and the light passing through the 90° polarizing patterns of the first polarizing plate 104 can pass through the 90° polarizing patterns of the second polarizing plate 106.

Accordingly, the light passed through the pair of polarizing plates 104 and 106 can be observed as a 2D image in which the left eye and right eye see the same image, that is, this becomes an ordinary 2D image display device. Thus, a light pattern 132 exits second polarizing plate 106.

Figure 6:
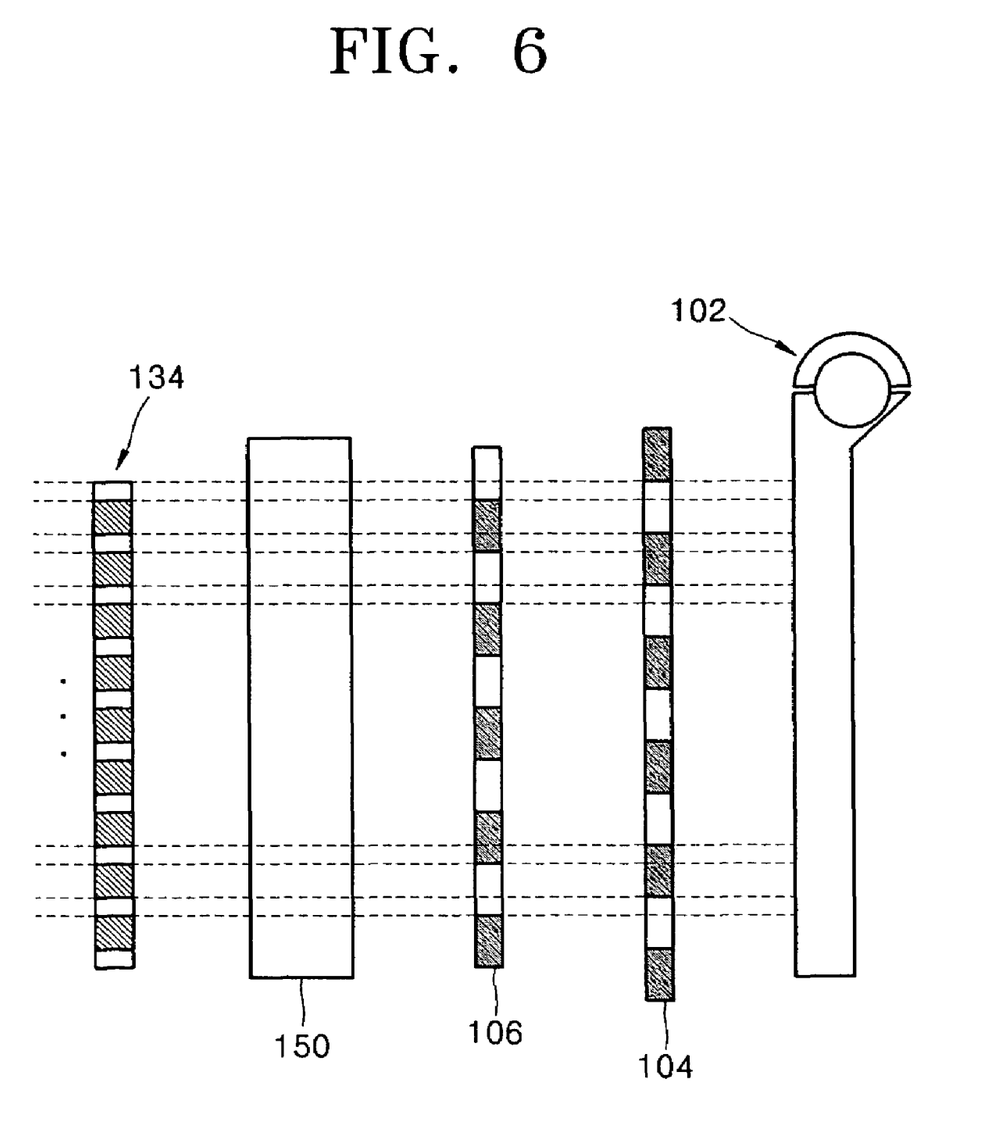
FIG. 6 is a cross-sectional view illustrating the operation of a display device consistent with a second exemplary embodiment of the present invention wherein a pair of linear polarizing plates are disposed between a TFT-LCD and a backlight unit.

FIG. 6 is a cross-sectional view for describing an operation of the display device 100 when the pair of linear polarizing plates 104 and 106 are disposed between the TFT-LCD 150 and the backlight unit 102.

The display device in FIG. 6 has the same operational principle as the display device depicted in FIGS. 5A and 5B, with the only difference being that the pair of patterned polarizing plates 104 and 106 are disposed between the TFT-LCD 150 and the backlight unit 102.

That is, in the case of the display device depicted in FIGS. 5A and 5B, the two patterned polarizing plates, i.e., the first and the second polarizing plates 104 and 106, are disposed in front of the TFT-LCD 150 to act as a parallax barrier. However, in the case of the display device depicted in FIG. 6, the pair of patterned polarizing plates 104 and 106 are disposed between the backlight unit 102 and the TFT-LCD 150 to act as the 3D image display parallax barrier. Accordingly, the device depicted in FIG. 6 is a switching device that changes a type of a backlight between one used for viewing a 2D image and one used for viewing a 3D image by slightly moving the first polarizing plate 104. The same effect can be obtained by slightly moving the second polarizing plate 106 parallel to the first polarizing plate 104.

The principle of the display of FIG. 6 is the same principle as explained with reference to the FIGS. 5A and 5B. That is, light that has passed through the 0° polarizing patterns of each of the first polarizing plate 104 and the second polarizing plate 106, and light that has passed through the 90° polarizing patterns of each of the first polarizing plate 104 and the second polarizing plate 106 can enter the TFT-LCD 150, while light that has passed through the 0° polarizing patterns of the first polarizing plate 104 does not pass through the 90° polarizing patterns of the second polarizing plate 106, and light that has passed through the 90° polarizing patterns of the first polarizing plate 104 cannot pass through the 0° polarizing patterns of the second polarizing plate 106.

The light that has passed through the first and the second polarizing plates 104 and 106 enters the third polarizing plate 152 (see FIG. 4), which is polarized at 135°, disposed at the front of the TFT-LCD 150 with a uniform intensity. As described with reference to FIG. 5A, a 3D image can be observed by crossing the patterns of the two polarizing plates 104 and 106 by slightly moving the first and/or the second polarizing plates 104 and 106.

On the other hand, 2D images can be observed by supplying a pattern for 2D images to the TFT-LCD 150 by aligning the two polarizing patterns of the first and the second polarizing plates 104 and 106.

Therefore, the display device 100 according to an embodiment of the present invention enables selectively switching between 2D and 3D modes by slightly moving the first and the second polarizing plates 104 and 106 with respect to each other in parallel.

Figure 7A:
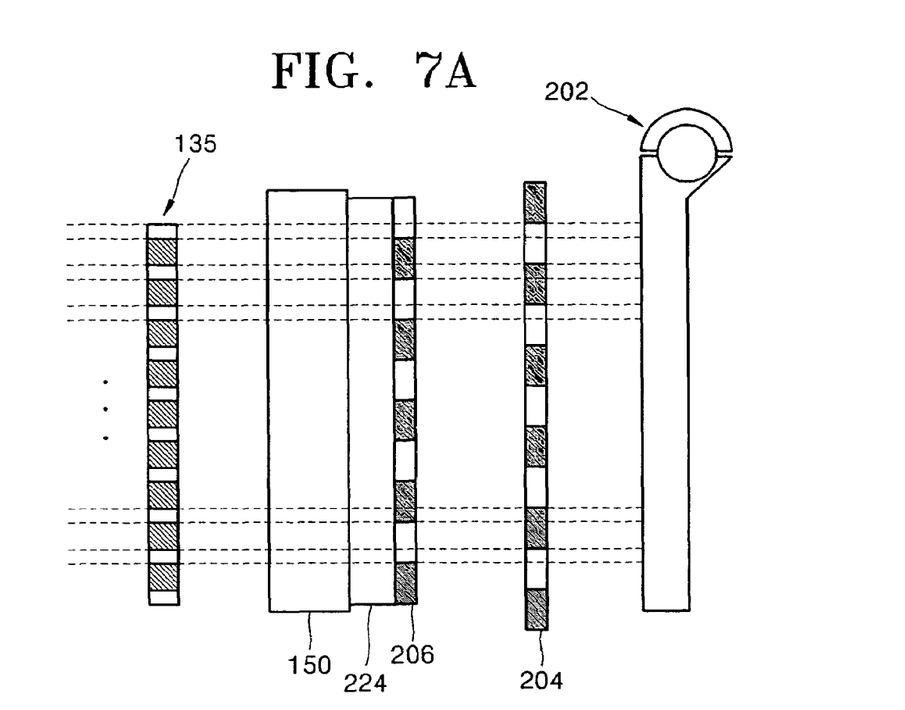
FIGS. 7A and 7B are cross-sectional views illustrating the operation of a display device consistent with a third embodiment of the present invention.
Figure 7B:
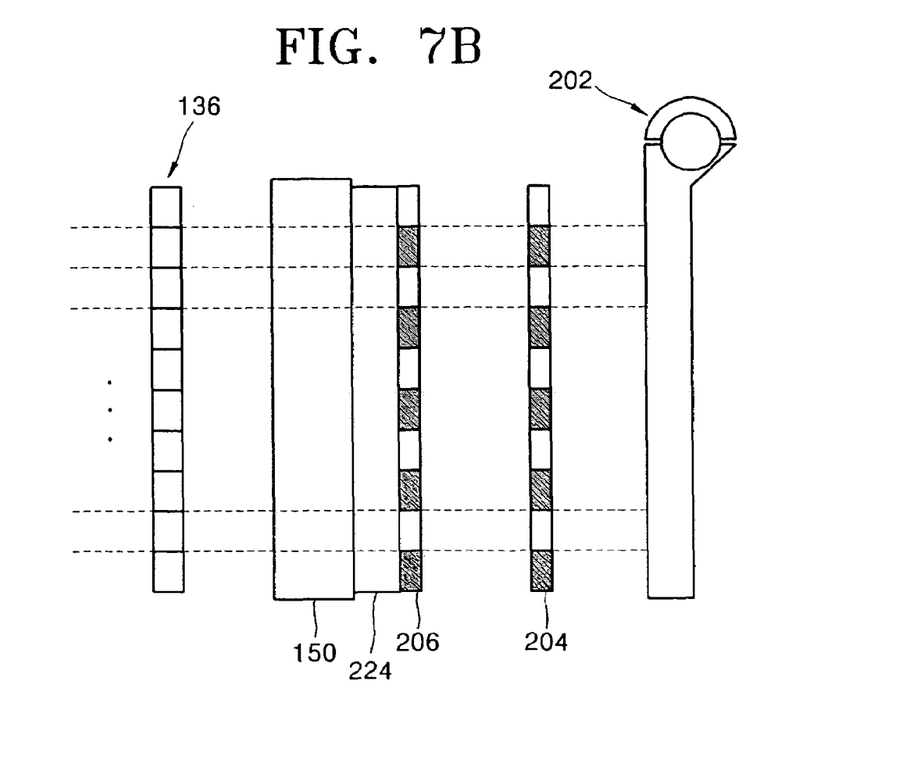

FIGS. 7A and 7B are cross-sectional views for describing an operation of a display device according to a third embodiment of the present invention. In the drawings, a black colored region of a pair of linear polarizing plates 204 and 206 represents a 135° polarizing pattern, and a white colored region represents 45° polarizing pattern.

The embodiment depicted in FIGS. 7A and 7B is different from the embodiment depicted in FIGS. 5A and 5B in that the pair of the first and the second polarizing plates 204 and 206 have stripe form patterns of 135° and 45° polarizing alternating patterns.

More specifically, when passing through the first polarizing plate 204 having the alternating 45° and 135° polarizing patterns, non-polarized light emitted from the backlight unit 202 becomes polarized light having 45° polarized and 135° polarized stripe form portions.

The 135° polarized light exiting from the first polarizing plate 204 cannot pass through the 45° polarizing patterns of the second polarizing plate 206 but can pass through the 135° polarizing patterns, and the 45° polarized light exiting from the first polarizing plate 204 cannot pass through the 135° polarizing patterns of the second polarizing plate 206, but can pass through the 45° polarizing patterns of the second polarized plate 206.

Thus, only light that has passed through the 45° polarizing patterns of both the first and second polarizing plates 204 and 206 or the 135° polarizing patterns of both the first and second polarizing plates 204 and 206 exit from the second polarizing plate 206.

The light that passes through the second polarizing plate 206 enters a λ/4 plate 224. A 135° polarized portion of light becomes left circularly polarized and a 45° polarized portion of the light becomes right circularly polarized when passing through the λ/4 plate 224.

Accordingly, as depicted in FIG. 7A, the left circularly polarized light and the right circularly polarized light form a regularly spaced pattern 135 such that the left eye and the right eye see different images. This is done by slightly moving the first polarizing plate 204 in parallel with the second polarizing plate 206 and fixing the second polarizing plate 206 in place.

On the other hand, as depicted in FIG. 7B, to display a 2D image when the 45° polarizing patterns of the second polarizing plate 206 and the 45° polarizing patterns of the first polarizing plate 204 are aligned by moving the patterned first polarizing plate 204 in parallel with the second polarized plate 206, thus aligning the 135° polarizing patterns of the second polarizing plate 206 and the 135° polarizing patterns of the first polarizing plate 204. Then the light that passes through the 45° polarized regions of both the first and the second polarizing plates 204 and 206 is transformed into a left circularly polarized light by the λ/4 plate 224, and the light that passes through the 135° polarizing patterns of both the first and the second polarizing plates 204 and 206 is transformed into right circularly polarized light by the λ/4 plate 224. At this time, the left circularly polarized light and the right circularly polarized light exiting from the λ/4 plate 224 are cast on a rear surface of the TFT-LCD 150, and the intensity of light passing through the third polarizing plate 152, which is 135° polarized, are uniform.

Accordingly, the light pattern 136 that has passed through the pair of non-polarizing plate 204 and 206 forms 2D images by allowing a left eye and a right eye to see identical images.

According to this embodiment, a width of a light valve through which light used for viewing 3D images passes can be easily controlled by moving one of the polarizing plates.

Figure 8:
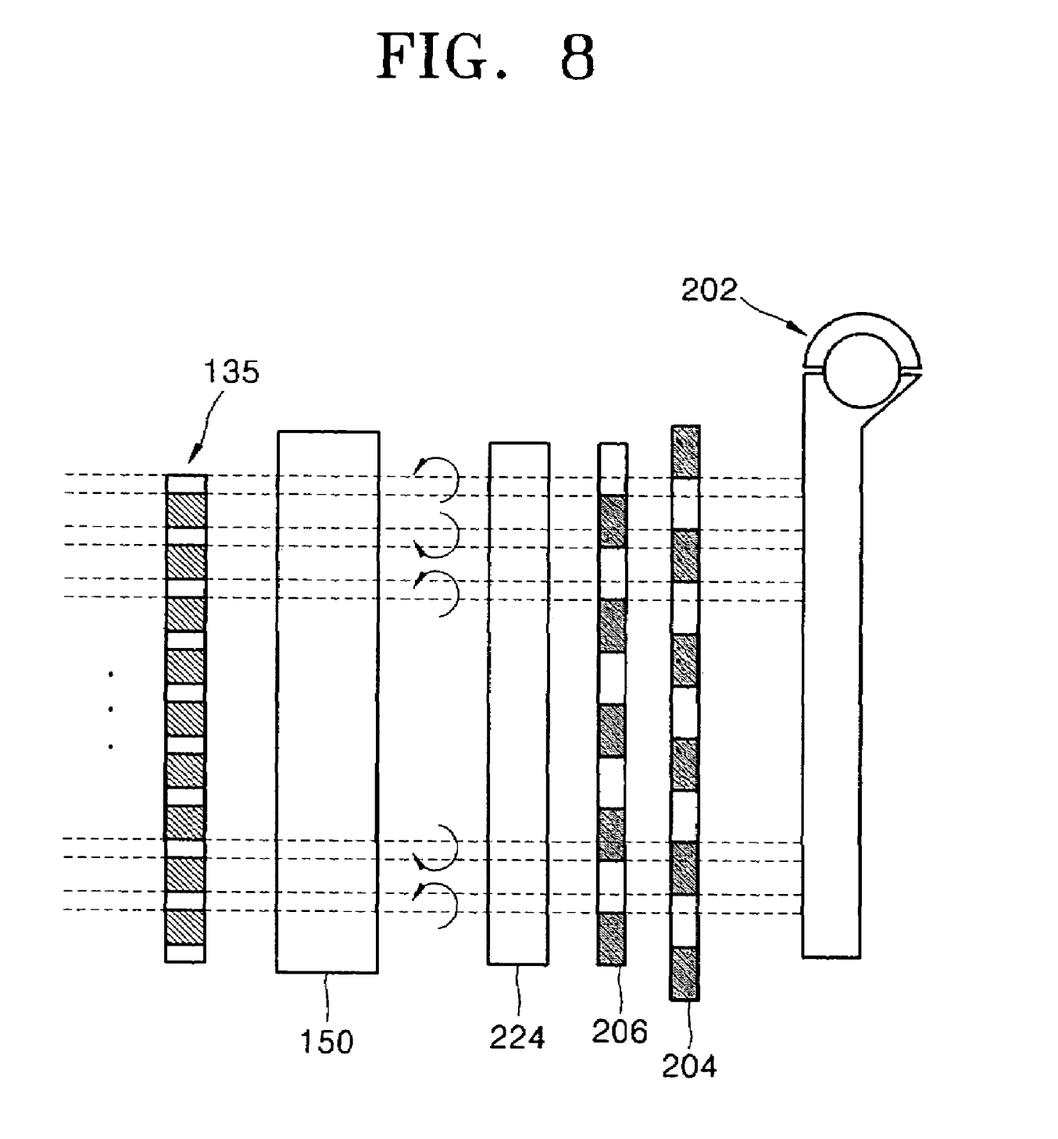
FIG. 8 is a cross-sectional view for describing an operation of a display device according to the embodiment shown in FIG. 7A.

FIG. 8 is a cross-sectional view further illustrating the operation principle of a display device according to the embodiment shown in FIGS. 7A.

As described above, a display device according to the above described exemplary embodiments allows a viewer to switch between 2D and 3D images by slightly moving one of a pair of polarizing plates, each having polarized regions forming columns, and the width of light valve through which light passes when displaying a 3D image can be easily controlled.

Also, according to the above described embodiments of the present invention, a display device is capable of displaying both 2D and 3D images without requiring continuous power consumption when viewing 3D images since the device does not use a liquid crystal shutter.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A display device that can switch between displaying two-dimensional (2D) and three dimensional 3D images comprising:
a backlight unit;
a liquid crystal device; and
a light control device, including a pair of polarizing plates interposed between the backlight and the liquid crystal device, wherein each of the polarizing plates has polarizing patterns, and at least one of the polarizing plates is moveable.

2. The display device of claim 1, wherein the polarizing pattern formed on each of the polarizing plates includes a plurality of alternating stripe form 0° polarized regions and stripe form 90° polarized regions.

3. The display device of claim 2, wherein the polarizing plate that is closer to the backlight is moveable in parallel with respect to the other polarizing plate so that a parallax illumination can occur.

4. The display device of claim 3, wherein the light control device displays 3D images when the 0° polarizing patterns of the movable polarized plate and the 0° polarizing patterns of the other polarizing plate are not aligned, and the 90° polarizing patterns of the movable polarizing plate and the 90° polarizing patterns of the other polarizing plate are not aligned.

5. The display device of claim 4, wherein a width of a light valve through which the light passes is controllable by controlling the amount of movement of the moveable polarizing plate.

6. The display device of claim 4, wherein the light control device displays 2D images when the 0° polarizing patterns of the movable polarizing plate and the 0° polarizing patterns of the other polarizing plate are aligned, and when the 90° polarizing patterns of the movable polarizing plate and the 90° polarizing patterns of the other polarizing plate are aligned.

7. The display device of claim 1, wherein the liquid crystal device comprises:
   a first transparent substrate;
   a third polarizing plate formed on a surface of the first transparent substrate;
   a transparent electrode formed on an opposite surface of the first transparent substrate;
   a liquid crystal unit formed on the transparent electrode;
   a patterned transparent electrode formed in the liquid crystal unit;
   a second transparent substrate formed on the liquid crystal unit; and
   a frontal polarizing plate formed on the second transparent substrate.

8. The display device of claim 7, wherein the third polarizing plate is a 135° polarizing plate and the frontal polarizing plate is 45° polarizing plate.

9. The display device of claim 1, wherein the polarizing pattern formed on each of the polarizing plates includes a plurality of alternating line-shaped 135° polarizing patterns and line-shaped 45° polarizing patterns.

10. The display device of claim 9, wherein a $\lambda/4$ plate is disposed between the third polarizing plate and the pair of the polarizing plate of the liquid crystal device.

11. The display device of claim 10, wherein the movable polarizing plate is disposed closer to the backlight than the other polarizing plate and can move parallel to the other polarizing plate.

12. The display device of claim 11, wherein the light control device displays 3D images when the 135° polarizing patterns of the movable polarizing plate and the 135° polarizing patterns of the other polarizing plate are not aligned, and the 45° polarizing patterns of the movable polarizing plate and the 45° polarizing patterns of the other polarizing plate are not aligned.

13. The display device of claim 12, wherein the width of the light valve through which the light passes is controllable by controlling the amount of movement of the moveable polarizing plate.

14. The display device of claim 11, wherein the light control device displays 2D images when the 135° polarizing patterns of the movable polarizing plate and the 135° polarizing patterns of the other polarizing plate are aligned, and when the 45° polarizing patterns of the movable polarizing plate and the 45° polarizing patterns of the other polarizing plate are aligned.

15. The display device of claim 1, wherein a width of a light valve through which the light passes is controllable by controlling the amount of movement of the moveable polarizing plate.

* * * * *